No. 889,449. PATENTED JUNE 2, 1908.
R. FLEMMING, Jr
CHEESE CUTTER.
APPLICATION FILED JULY 30, 1907.
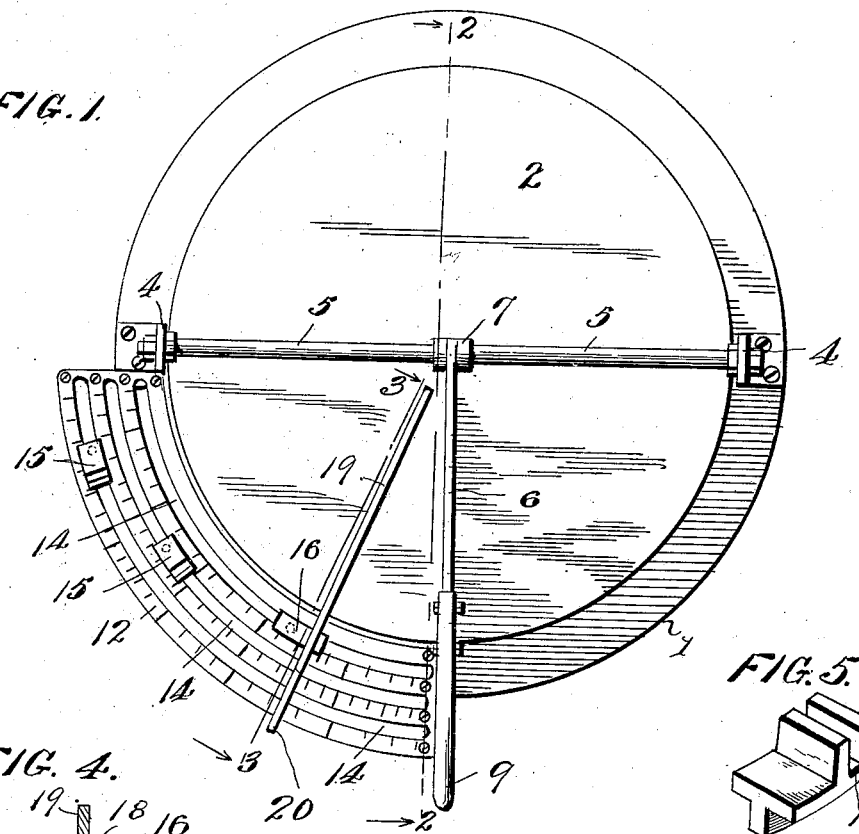
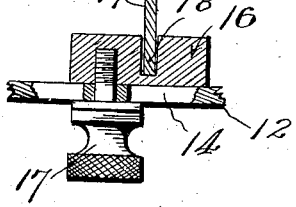
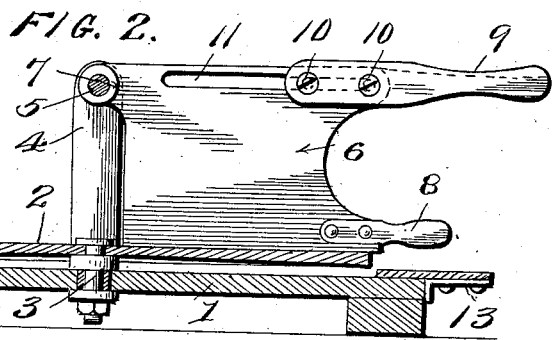
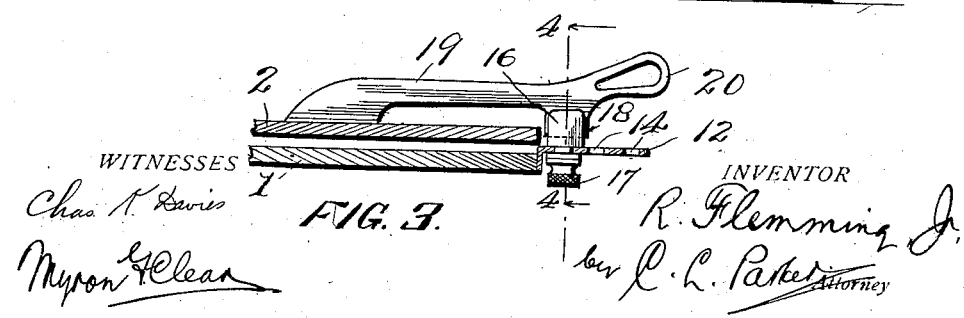
WITNESSES
Chas. N. Davis
Myron H. Clear
INVENTOR
R. Flemming Jr.
by C. L. Parker, Attorney

UNITED STATES PATENT OFFICE.

RICHARD FLEMMING, JR., OF NEW ORLEANS, LOUISIANA.

CHEESE-CUTTER.

No. 889,449.  Specification of Letters Patent.  Patented June 2, 1908.

Application filed July 30, 1907. Serial No. 386,224.

*To all whom it may concern:*

Be it known that I, RICHARD FLEMMING, Jr., a citizen of the United States, residing at New Orleans, in the parish of Orleans and State of Louisiana, have invented certain new and useful Improvements in Cheese-Cutters, of which the following is a specification.

My invention relates to cheese-cutters and particularly contemplates the provision of an improved device of this character whereby three or more different grades of cheeses may be cut with unvarying accuracy and according to the price per pound of each without readjustment of the gager.

My invention further and specifically resides in the following features of construction, arrangement and operation as will be hereinafter described with reference to the accompanying drawings forming a part of this specification, in which like numerals are used to designate like parts throughout the several figures, and in which- Figure 1 is a top plan view of my improved cheese cutter, Fig. 2 is an enlarged vertical sectional view taken therethrough on the line 2—2 of Fig. 1, Fig. 3 is a detail sectional view therethrough on the line 3—3 of Fig. 1, Fig. 4 is an enlarged detail sectional view taken on the line 4—4 of Fig. 3, and Fig. 5 is a perspective view of one of the gage spacers.

In the practical embodiment of my invention I provide a circular stationary base 1, supporting thereon a circular rotatable cheese plate 2, of smaller diameter than the base 1, by means of the central pivot bearing 3. The base 1 is further provided with the oppositely disposed upstanding brackets 4 secured to the same outside the edges of the cheese plate 2 and supporting between their upper ends a rotatable shaft 5. The cutting blade 6 is provided with a transverse socket portion 7 secured upon the shaft 5 centrally from its length, said blade being adapted to extend across one half the diameter of the cheese plate 2 at substantially right angles to the rotatable shaft 5 and being adapted to be swung upwardly from the plate 2 and downwardly toward the same by virtue of its connection with the said rotatable shaft 5 and by means of small and large handles 8 and 9 respectively secured to its lower and upper edges. The small handle 8 is rigidly secured at the lower edge of the blade 6 and extends for only a short distance beyond said blade, while the larger handle 9 arranged at the upper edge of said blade projects outwardly therefrom for quite a distance, and in order to allow of the ready placement of a cover over the device, I preferably provide said large handle 9 with clamping screws 10 arranged through a longitudinal slot 11 in the blade 6, whereby the handle 9 may be slid inwardly along said blade within said slot and clamped at the desired point by means of screws 10.

The adjusting portion of my cheese cutter comprises a curved gage plate 12 arranged above a cut-out portion of the base 1 and secured thereto at its ends by means of brackets 13. The gage plate 12 is provided with a plurality of graduated runs 14 for the reception within each, of a spacer block 15 or a gage block 16. In the accompanying drawings I have shown the gage plate 12 as provided with three runs 14, the two outer ones of which are provided with spacer blocks 15, while the inner run is provided with a gaging block 16, thus the gages may be set for cutting three different qualities of cheese, the primary gage block 16 being provided with a set screw 17 screwed quickly therein through its respective run whereby the same may be locked after adjustment. Each of the spacer blocks 16 are provided with transverse slots in the surfaces thereof for the reception of the projection 18 of a stop 19 extending inwardly upon the cheese plate 2 and adapted to receive the cut face of the cheese thereagainst when the same is being gaged for a cut. The stop 19 is provided with a handle 20 projecting therefrom in order to steady the same.

Having thus fully described my invention, I claim:

1. In a cheese cutter, the combination of a stationary base, a rotatable cheese plate mounted thereon, a cutting blade mounted to swing above said cheese plate, a gage plate secured adjacent said base and provided with a plurality of juxtaposed graduated runs adapted each to receive a gage block adjustably therein, a stop plate, and means formed upon each of said gage blocks adapted to removably hold said stop plate thereon, substantially as described.

2. In a cheese cutter, the combination of a stationary base, a rotatable cheese plate mounted thereon, brackets secured and upstanding from said base outside said cheese plate, a rotatable shaft journaled between said brackets, a cutting blade secured upon said rotatable shaft, and a handle for said cutting blade having longitudinal sliding engagement with the same, substantially as described.

3. In a cheese cutter, the combination of a stationary base, a rotatable cheese plate mounted thereon, a cutting blade mounted to swing above said cheese plate and provided with a longitudinal slot, and a handle therefor provided with clamping screws engaging within said slot, substantially as described.

4. In a cheese cutter, the combination of a stationary base, a rotatable cheese plate mounted thereon, a cutting blade mounted to swing above said cheese plate, a curved gage plate secured adjacent said base and provided with a plurality of juxtaposed parallel slots conforming to the curve thereof and constituting runs adapted each to receive a gage block adjustably therein, said plate being graduated along the material thereof adjacent each of said runs, and a stop plate, each of said gage blocks being provided with a slot adapted to removably receive a portion of said stop plate, substantially as described.

In testimony whereof I affix my signature in presence of two witnesses.

RICHARD FLEMMING, JR.

Witnesses:
ANDRÉ DONOCOURT, Jr.,
WM. H. LUZENBERG.